United States Patent
Ziegelaar et al.

(10) Patent No.: US 7,093,342 B2
(45) Date of Patent: Aug. 22, 2006

(54) HOT ROLLING THIN STRIP

(75) Inventors: John Albert Ziegelaar, Farmborough Heights (AU); Michael Angel Lopez, Dapto Heights (AU); Andrew Edward Dixon, Panania (AU)

(73) Assignee: Castrip LLC, Charlotte, NC (US)

( * ) Notice: Subject to any disclaimer, the term of this patent is extended or adjusted under 35 U.S.C. 154(b) by 0 days.

(21) Appl. No.: 10/296,354

(22) PCT Filed: May 25, 2001

(86) PCT No.: PCT/AU01/00604

§ 371 (c)(1),
(2), (4) Date: Dec. 31, 2002

(87) PCT Pub. No.: WO01/91934

PCT Pub. Date: Dec. 6, 2001

(65) Prior Publication Data

US 2004/0025558 A1 Feb. 12, 2004

(30) Foreign Application Priority Data

May 26, 2000 (AU) .................................. PQ 7799

(51) Int. Cl.
*B21B 1/46* (2006.01)
(52) U.S. Cl. ...................................... 29/527.7; 72/205
(58) Field of Classification Search .................. 72/8.6, 72/8.7, 12.3, 205
See application file for complete search history.

(56) References Cited

U.S. PATENT DOCUMENTS 3,292,402 A * 12/1966 O'Brien ........................ 72/11.4
4,261,190 A * 4/1981 Fapiano ......................... 72/8.7
4,766,947 A * 8/1988 Shibuya et al. ............. 164/460

FOREIGN PATENT DOCUMENTS

DE 44 13 913 A1 11/1994

(Continued)

OTHER PUBLICATIONS

Wray P J: "Effect of Carbon Content on the Plastic Flow of Plain Carbon Steels at Elevated Temperatures" Metallurgical Transactions A. Physical Metallurgy and Materials Science, Metallurgical Society of AIME, New Youk, US, vol. 13A, Jan. 1982, pp. 125-134, XP008061006.

(Continued)

*Primary Examiner*—Lowell A. Larson
(74) *Attorney, Agent, or Firm*—Hahn Loeser & Parks LLP; Arland T. Stein

(57) ABSTRACT

Thin steel strip is passed through a pinch roll stand comprising pinch rolls to a rolling mill comprising a pair of work rolls and upper and lower backing rolls. Strip passes through the bite between the work rolls and strip squeezing forces are applied between the work rolls to reduce the thickness of the strip. The pinch rolls apply tension to the strip passing to the work rolls. In order to minimize generation of crimping defects in the strip, the tension applied by the pinch rolls is high enough to ensure no part of the strip entering the work rolls is in longitudinal compression such as to exceed the buckling stress of the strip. The applied tension is sufficiently low as to produce no more than 1% strip elongation through creep. The strip may be hot rolled by the work rolls at a temperature in the range of 700° C.–1200° C.

22 Claims, 3 Drawing Sheets

FOREIGN PATENT DOCUMENTS

| | | |
|---|---|---|
| EP | 0 760 397 | 3/1997 |
| EP | 0 903 187 | 3/1999 |
| GB | 2 072 556 | 10/1981 |
| JP | 58-006706 | 1/1983 |
| JP | 63-052702 | 3/1988 |
| JP | 63-52702 | 3/1988 |
| JP | 02 280904 | 11/1990 |
| JP | 08-192210 | 7/1996 |
| JP | 09 019748 | 1/1997 |
| JP | 09 052108 | 2/1997 |
| WO | 92/01524 | 2/1992 |
| WO | 01/39905 | 6/2001 |

OTHER PUBLICATIONS

Somers R R et al: "Verification and Applications of a Model for Predicting Hot Strip Profile, Crown and Flatness: Strip Profile, Crown and Flatness" Iron and Steel Engineer., vol. 61, No. 9, Sep. 1984, pp. 35-44, XP002374735 US Association of Iron and Steel Engineers. Pittsburgh.

Supplementary European Search Report for Application No. EP 01 93 3465 dated Mar. 29, 2006.

* cited by examiner

HOT ROLLING THIN STRIP

CROSS-REFERENCE TO RELATED APPLICATIONS

This application is a U.S. national counterpart application of international application serial no. PCT/AU01/00604 filed May 25, 2001, which claims priority to Australian application serial No. PQ 7799 filed May 26, 2000.

BACKGROUND AND SUMMARY OF INVENTION

This invention relates to the hot and warm rolling of thin strip typically above 700° C. It has particular, but not exclusive, application to in-line rolling of thin steel strip produced by direct casting with a twin roll caster where shape correction of the strip is important.

Recent developments in twin roll strip casting have enabled steel strip to be produced to thickness of the order of less than 5 mm and typically 3 mm and less. Such strip can be further reduced in thickness by reduction in an in-line hot rolling mill as it is produced from the caster. It has been found that when hot rolling such strip to further reduce the thickness significant defects can be generated in the strip due to crimping of the strip material on entry to the work rolls of the mill. Such crimping defects may be relatively minor and appear as curved lines seen on the surface of the strip. However, particularly when rolling very thin strip, the crimped parts of the strip may become folded over prior to rolling so that parts of the strip become heavily reduced and split with resulting very severe defects.

Such crimping defects have been found to be due to variations in the strip thickness and the resulting reduction across the width of the strip. Typically, the center part of the strip may be subjected to higher percentage reduction than the strip edges, or "waves" may occur across the width of the strip. The latter manifests as "waves" along the length of the strip. The action of reduction through the rolling mill creates more backwards slip in the thicker portions of the strip relative to the thin portions of the strip. The thicker parts of the strip will therefore be subject to lengthwise compression whereas the thinner parts will be subjected to tension, and that will cause buckling. The buckles are then rolled into the strip to create downstream shape defects. In extreme cases the strip may completely fold over at the buckles and the folded over material is rolled-in to produce severe defects. Where variations in strip thickness across the strip width are localized to small parts of the strip width, the result can be localized crimping of the strip. The extent of the crimping is related to the size of the difference in thickness across the strip width and the extent of the strip width affected by the difference in reduction.

We have found that crimping during hot rolling of thin steel strip of less than about 3 mm thickness can be substantially controlled by ensuring that the strip entering the rolling mill is subjected to tension within specific limits. More specifically, we have found it is possible by applying certain tension that buckling of the strip of the kind which will initiate crimping can be avoided, while at the same time, maintaining the tension below an upper limit to avoid excessive strip creep (leading to necking or tearing) that will damage the strip.

An illustrative embodiment of the invention provides a method of shape correction by hot rolling of thin steel strip of the type most typically produced by direct casting using a twin roll caster, comprising feeding the strip through a roll bite between a pair of work rolls, applying strip squeezing forces between the work rolls to reduce the thickness of the strip, and applying tension to the strip passing to the work rolls sufficiently high to ensure no part of the strip entering the work rolls is in longitudinal compression such as to exceed the buckling stress of the strip and sufficiently low as to produce no more than 1% strip elongation through creep. The tension allowable to produce no more than 1% elongation through creep was determined as described in "Effect of Carbon Content on Plastic Flow of Plain Carbon Steel at Elevated Temperatures", P. J. Wray, American Society for Metals and the Metallurgical Society of AIME, Vol 13 (January 1982).

While the strip may be in excess of 2.5 mm thick prior to rolling, it may also have a pre-rolling thickness of as low as about 0.5 mm or less.

The strip may be hot rolled at a temperature of at least about 700° C. The strip may also be hot rolled up to a temperature of about 1200° C. The degree of reduction of the strip thickness through the work rolls is generally about 35% or less, and is determined usually by the customer choice of thickness in the final strip.

The applied tension may be such as to limit the strip elongation through creep to no more than 0.5%.

Preferably, the variation in strip thickness reduction across the strip imposed by the work rolls is sufficiently small to prevent strip shape defects and surface creasing downstream of the work rolls of more than 200 I-units. However, in some circumstances, the variation in reduction may be such as to permit downstream shape defects and surface creasing of up to 400 I-units. The produced strip will vary in shape defects across its width; these I-unit figures are the worst case shape defects and surface creasing of the strip. The rolled strip so produced is typically additionally processed after cooling in a commercial skin pass mill to produce flatter strip with shape defects and surface creasing below 100 I-units.

I-units are a measure of the flatness of the strip produced. I-units are determined by the equation:

$$\text{I-units} = (h/l)^2 \times 24.649$$

where "h" is the peak to peak amplitude, and "l" is the distance between peaks (i.e. wavelength) of the shape defects in the strip. Sometimes by convention in operation 24.649 is rounded to 25 in use of this equation in determining the I-units.

The tension is typically applied to the strip by passing it through a pair of pinch rolls in advance of the work rolls, but additional pinch rolls may be also be used downstream of the work rolls to maintain tension across the work rolls. The greater the tension at the work rolls the lesser the rolling load to achieve a given reduction.

BRIEF DESCRIPTION OF THE DRAWINGS

In order that the invention may be more fully explained, the determination of appropriate strip tensions and one form of rolling apparatus for operation in accordance with the invention will be described in some detail with reference to the accompanying drawings in which:

FIG. 4 illustrates part of the strip mill installation, which can be operated to hot roll thin steel strip in accordance with the present invention.

DETAILED DESCRIPTION OF THE DRAWINGS

Figure 1:
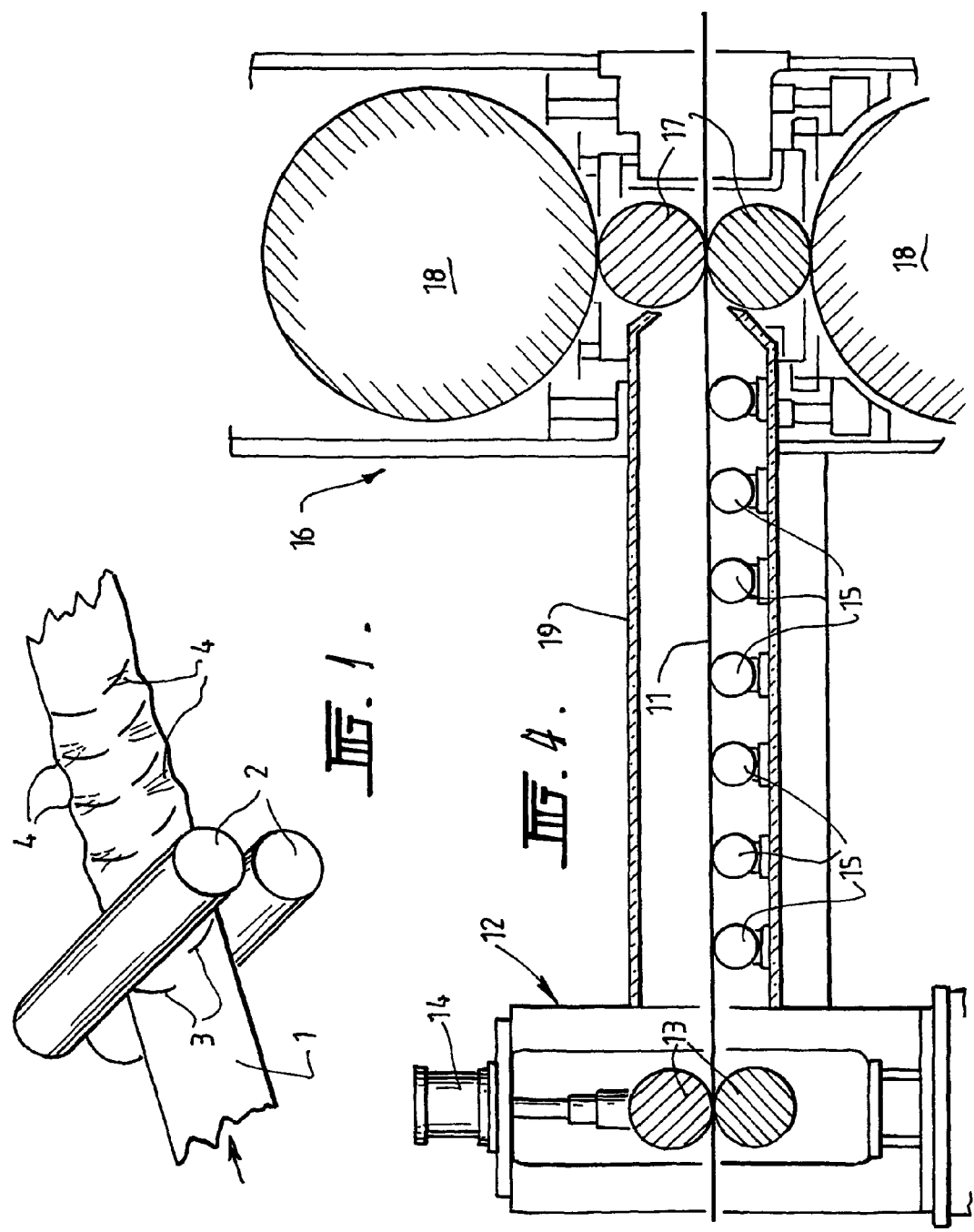
FIG. 1 illustrates diagrammatically the typical formation of crimping defects in hot rolling thin strip of less than 3 mm made by direct casting with a twin roll caster.

FIG. 1 diagrammatically illustrates a strip 1 passing through a roll bite between a pair of work rolls 2 of a rolling mill in circumstances where there is upstream buckling at the locations 3 which are rolled in to produce downstream defects 4 (shape defects and surface ceasing, or crimping). This illustrates the problem addressed by the present invention.

As the lateral variation in elongation after rolling is also the downstream shape defect it can be shown, as discussed in the Appendix, that the magnitude of crimping must be less than this shape defect. In particular, the Appendix to this specification shows that the "crimping" strip strain $|d\epsilon_0|$ at mill entry is given by:

$$|d\epsilon_0| \leq |d\epsilon_s| \quad (1)$$

where $|d\epsilon_s|$ is the downstream shape defect magnitude expressed as an elongation strain. That is, the upstream crimping strain is always less in magnitude than the downstream shape defect strain. The downstream shape defect is easier to measure than the crimping strain and the maximum shape defect allowable for downstream processing is better defined, being typically less than 200 I-Units, although in some circumstances the variation in downstream shape defects may be up to 400 I-units. As the upstream crimping strain must be less in magnitude than the downstream strip shape strain this in turn gives the maximum expected crimping strain for such strip under normal rolling conditions.

Figure 2:
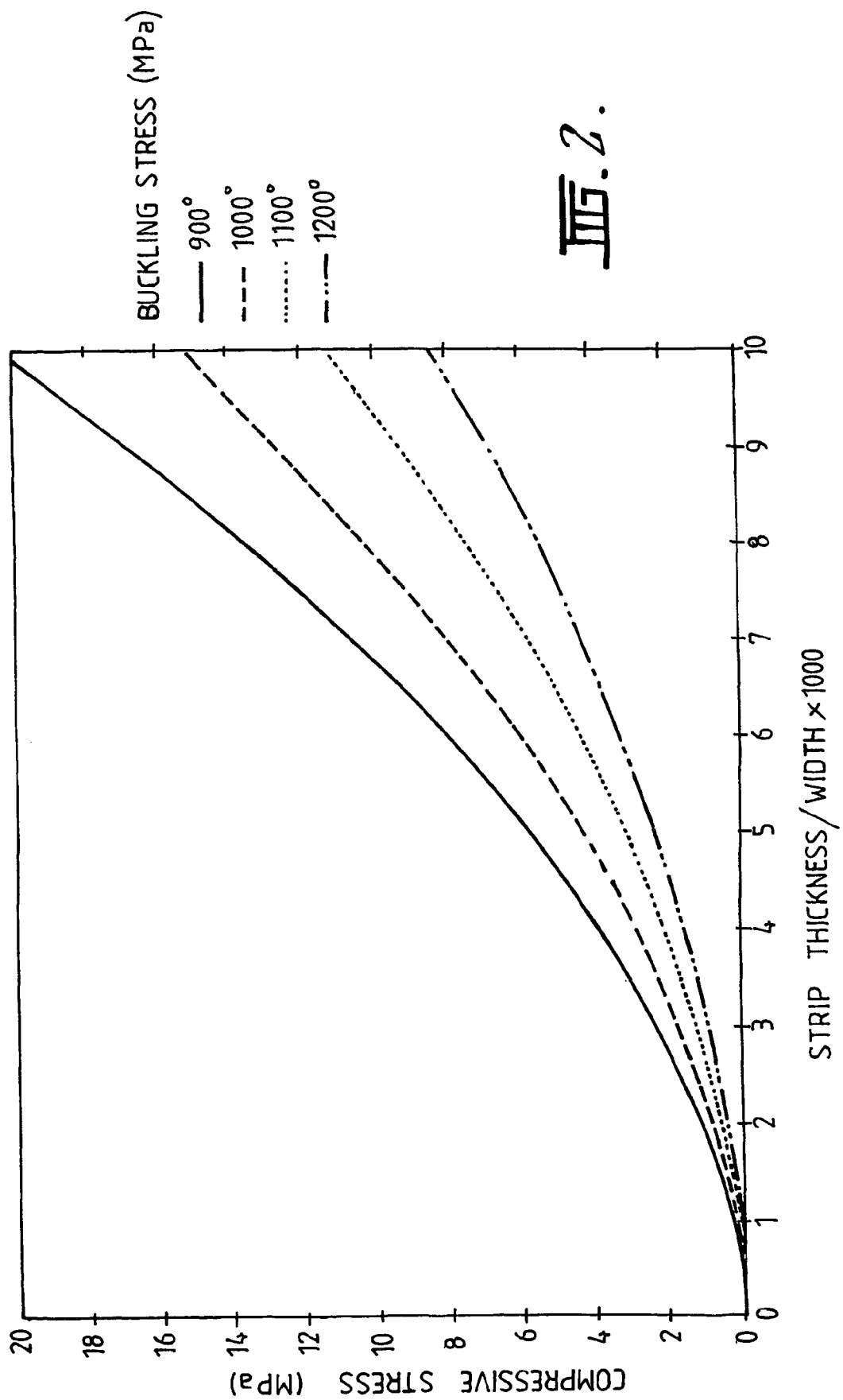
FIG. 2 is a graph plotting the necessary compressive stress for buckling for a given strip thickness to width ratio and strip temperature.

It should be noted that the problem addressed by the present invention is directed to thin strip such as that made by casting with a twin roll caster, where the shape defects are not uniform across the width of the strip. If the strip is sufficiently thick then buckling will not occur despite the transverse variation in elongation due to the strip's flexural rigidity. The minimum buckling strain has previously been empirically related to the strip thickness and width for the case of Shape Defects by Somers et al in the following publication: Somers R. R. et al (1984), "*Verification and Applications of a Model for Predicting Hot Strip Profile, Crown and Flatners*", *Iron and Steel Engineer*, September pp35–44. The same theory can be applied to upstream "crimping". FIG. 2 shows the necessary corresponding compressive stress for buckling for a given strip thickness to width ratio and strip temperature.

For strips of less than 2.5 mm thickness and greater than 1000 mm width, the necessary compressive stress is less than 2 Mpa (i.e. mega pascals). The buckling stress will easily be surpassed for typical present shape defects, which are of order 5 to 10 Mpa in stress. For thicker strip of 10 mm, the buckling stress is of order 10 to 20 MPa and hence buckling is unlikely to occur. Also, the problem is typically not present in conventional rolled thin strip since the thin strip is produced by compression through previous rolling mills and the resulting strip is relatively uniform thickness profile across the width of the strip with a center crown.

The applied tension necessary to avoid crimping provides no part of the strip is in compression, and any compression is less than the buckling limit of the strip. The strip must be elastically elongated so that the shorter sections of the strip are stretched to match the longer more elongated regions. This tension stress t is given by the product of the Elastic Modulus E and the worst case "crimp" expressed as a compressive strain $d\epsilon_0$. Using Equation (1) above, an entry tension can be derived in terms of the downstream shape defect as:

$$t = E|d\epsilon_0| \approx Ed\epsilon_s$$

Figure 3:
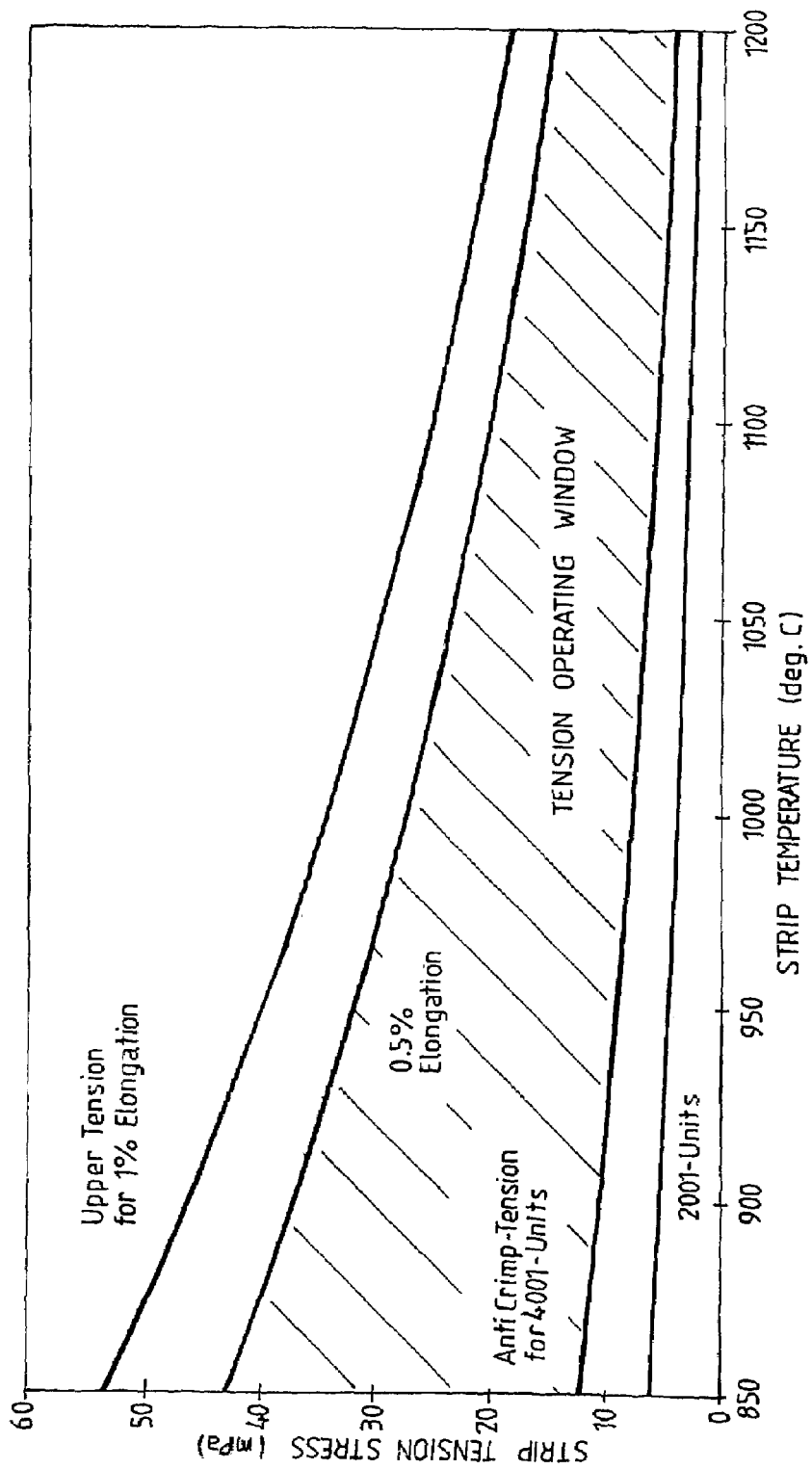
FIG. 3 plots upper and lower entry tension limits for typical thin steel strip when hot rolled at temperatures of 850° C. to 1200° C. in accordance with the present invention.

If the maximum allowable shape defect is 200 I-Units, or 0.2% compressive elongation, then the necessary applied tension stress t to avoid crimping can be calculated. The strip elastic modulus is temperature dependent and for the present purpose was modeled from experimental data by $$E = 41\exp(-T/330)\text{GPa}$$

where T is temperature in degrees Celsius. The minimum applied entry stress to avoid crimping for 200 and 400 I-Units downstream shape defects is shown in FIG. 3 for the Elastic Modulus at the different strip temperatures for a typical silicon/manganese killed steel strip as produced by a twin roll caster. That steel may have the composition:

| | |
|---|---|
| Carbon | 0.05–0.10% by weight |
| Manganese | 0.50–0.70% by weight |
| Silicon | 0.20–0.30% by weight |
| Aluminum less than | 0.008% by weight |

FIG. 3 shows an extreme case with 400 I-Units shape defect. This extra tension may be necessary at "head" ends of casting and rolling before steady state control conditions are reached.

The maximum applied tension must be such as to avoid excessive strip creep (leading to necking or tearing) of the strip. Creep will always occur to some extent for rolling of hot strip under tension. The tension stress necessary to cause a given degree of strain is dependent on the temperature and to a much lesser extent the strain rate. For a given maximum strain deemed allowable the maximum tension stress can be predicted for a strain rate with the use of a Creep Model. For the present case the creep stress was determined by the Model $$t(MPa) = 3000\left(\frac{\epsilon_{max}}{100}\right)^{0.23}\left(\frac{u\epsilon_{max}}{60l}\right)^{0.09}\exp(-T/330)$$

where $\epsilon_{max}$ is the maximum percentage creep strain permitted, u is the strip speed in meters/min and l is the length in meters the strip is under tension. The coefficients were found from experimental data for this grade of steel. This is shown as upper stress limits in FIG. 3 for both 0.5% and 1% maximum elongation creep strains between the tension device and rolling mill spaced 1 m apart at strip speeds of 60 m/min. It was found that for a doubling/halving of the strain rate, brought about by a similar variation in the casting velocity, for example, then this stress varied by only 5%.

FIG. 3 shows the tension windows for thin strip (less than 3 mm) that should ensure no crimping but also avoid excessive strip creep over the temperature range of 900° C. to 1200° C. The maximum downstream shape can be assumed to be either 200 I-Units or 400 I-Unit. The former is the typical upper limit. The latter is representative of a typical extreme cases such as might be present at head or tail ends of a cast or during tracking problems. The upper limits of the anti-crimping tension were such that the elongation creep is less than 0.5% or 1% elongation. The allowable tension to produce no more than 1% elongation through creep, as indicated above, was determined as described in "Effect of Carbon Content on Plastic Flow of Plain Carbon Steels at Elevated Temperatures", by P. J. Wray, American Society for Metals and the Metallurgical Society of AIME, Vol. 13A (January 1982).

These results are for manganese/silicon-killed steel as discussed above. For aluminum-killed steel the maximum tensions would typically be reduced by 25% but this would depend on the strip chemistry. Typical aluminum killed steel may comprise about 0.06% by weight of carbon, about 0.25% by weight manganese, about 0.15% by weight of aluminum.

It will be seen that the necessary tension increases with a lowering of the strip temperature due to increase in the Elastic Modulus. Typically, the lower tension stress limits ranged from about 5 (11) MPa for 900 □C to 2 (4) MPa for 1200° C. for 200 (400) I-Unit shape respectively. The upper tensions were 37 to 15 MPa over the same temperature range for 0.5% maximum strip elongation.

The same tension stress limits are expected to apply to stainless steel 304.

FIG. 4 illustrates part of a rolling mill installation, which can be operated in accordance with the present invention. In this rolling mill installation a thin steel strip 11 is passed through a pinch roll stand 12 comprising a pair of pinch rolls 13 to which strip gripping forces are applied by a pair of hydraulic cylinder units 14 disposed one to each side of the pinch roll stand.

After passing through pinch roll stand 12 the strip 11 is supported on a table formed by a succession of rollers 15 across which it passes to a rolling mill 16 comprising a pair of work rolls 17 disposed one above the other and a pair of upper and lower backing rolls 18. Strip reduction forces are applied between the work rolls 17 by means of hydraulic cylinder units (not shown) disposed at the two sides of the rolling mill and acting through the upper backing rolls 18. Between pinch roll stand 12 and rolling mill stand 16; the strip is held within a sealed enclosure 19.

In accordance with the present invention the pinch roll is operated to apply a tension in the strip entering the rolling mill which is sufficiently high to prevent crimping, but low enough to avoid excessive creep.

The illustrated apparatus is advanced by way of example and as indicative of the best method of performance of the invention presently known to the applicant. However other forms of apparatus would be feasible. In particular, although a single pair of pinch rolls are a simple and efficient means of developing tension in the strip in advance of the work rolls, it would be possible to use other means of generating tension such as a series of pinch rolls or bridle rolls, and preferably pinch rolls, a series of pinch rolls or bridle rolls downstream from the rolling mill.

APPENDIX

Correspondence Between Shape and Crimping

Shape defects occur when reduction through a rolling mill is not uniform across the strip width and hence local regions with more reduction produce longer strip downstream than the reference. This longer strip will locally buckle. If dr is the local variation in the degree of proportional thickness reduction, and $d\epsilon_s$ is the local variation in strip strain extension, proportional to strip length (shape), then by conservation of strip mass flow we can show that $$d\epsilon_s = dr/(1-r)$$

where r is the reference (mean) strip reduction. Strip shape tolerance limits are generally well defined.

Now let us consider the region of the rolling mill and assume the strip enters this region with a uniform speed across the width and hence no upstream crimping. If there is a non-uniform reduction then from mass flow conservation the strip must exit the rolling region at non-uniform speeds depending on the extension (shape) variation. In particular from mass flow considerations the exit speed $u_{exit}$ can be expressed in terms of the entry speed $u_{entry}$ and thickness $h_{entry}$ together with the exit thickness $h_{exit}$. Mathematically we can write:

$$u_{exit} = u_{entry} h_{entry}/h_{exit} = u_{entry}/(1-r)$$

$$du_{exit} = u_{exit} dr/(1-r) = u_{exit} d\epsilon_s$$

where $du_{exit}$ is the variation in strip exit speed and by the cond equation is dependent on the downstream strip shape. A larger reduction causes a faster exit speed. In general this situation cannot occur as the roll and strip speeds are closely related and an arbitrary variation of strip exit speed from the strip shape will wrongly imply variation in roll speed along its axis. The assumption that strip entry speed near the rolling region being uniform along the strip width can therefore not be true.

Let us now assume the other extreme where the strip exit speed is uniform. Using the same argument the strip entry speed into the rolling region is given by $$u_{entry} = (1-r)u_{exit}$$

$$du_{entry} = -u_{exit} dr = -u_{entry} dr/(1-r) = -u_{entry} d\epsilon_s$$

where $du_{entry}$ is the variation in entry speed. A downstream strip shape defect of the form of local relative strip extension therefore reduces the entry speed. Far upstream from the rolls the strip speed is uniform and so locally the strip must slow (backward slip) and become compressed as it enters the rolling region. The corresponding strip compressive (negative tension) stress due to the downstream shape is then $$t = Ed\epsilon_0 = E\frac{du_{entry}}{u_{entry}} = -Ed\epsilon_s$$

where $d\epsilon_0 = du_{entry}/u_{entry}$ is the upstream crimping strain. We now have a formula relating to the upstream tension variation to the downstream shape defect. If this compressive stress is too large then buckling will occur upstream with the undesirable effects mentioned previously. To overcome this buckling, a positive entry tension may be added of magnitude equal to the greatest compressive tension from the shape defect.

The above two scenarios are the extreme cases and in practise conditions (about half way) between occurs causing variation in strip speed (and tension) near the rolls both upstream and downstream of half the above magnitude. The above stress formula is therefore the upper limit for upstream compression but can still be used giving an inbuilt safety margin.

The invention claimed is:

1. A method of continuously casting thin steel strip of no more than 3 mm in thickness comprising:
    (a) casting thin steel strip to no more than 3 mm in thickness in a twin roll caster,
    (b) feeding the cast strip of no more than 3 mm in thickness through a roll bite between a pair of work rolls,
    (c) applying strip squeezing forces between the work rolls to reduce the thickness of the cast strip, and
    (d) applying tension to the cast strip passing to the work rolls sufficiently high to avoid buckling stress in the strip entering the work rolls, and sufficiently low as to produce no more than 1% strip elongation through creep.

2. A method as claimed in claim 1, wherein the strip thickness is in the range of 0.5 mm to 2 mm prior to feeding to the work rolls.

3. A method as claimed in claim 2, wherein the strip is hot rolled at a temperature in the range of 700° C. to 1200° C.

4. A method as claimed in claim 3, wherein the strip is hot rolled at a temperature in the range 900° C. to 1200° C.

5. A method as claimed in claim 1, wherein the strip is hot rolled at a temperature in the range of 700° C. to 1200° C.

6. A method as claimed in claim 5, wherein the strip is hot rolled at a temperature in the range 900° C. to 1200° C.

7. A method according to claim 1, wherein the applied tension is such as to limit the strip elongation through creep to no more than 0.5%.

8. A method according to claim 1, wherein the variation in strip thickness reduction across the strip as imposed by the work rolls is such that the strip shape defects downstream of the work rolls are no more than 400 I-units.

9. A method according to claim 8, wherein said variation in strip thickness reduction is such that the strip shape defects downstream of the work rolls is no more than 200 I-units.

10. A method according to claim 1, wherein tension is applied to the strip by passing said strip through a pair of pinch rolls in advance of the work rolls.

11. A method according to claim 1, wherein the strip is a manganese/silicon killed steel strip of thickness in the range 0.5 mm to 3 mm,
    the strip is hot rolled in the temperature range 900° C. to 1200° C.,
    and the applied tension is within an operating range between maximum and minimum values defined by:
    tension max=maximum allowable elongation at the rolling temperature, and
    tension min=maximum strip buckle stress allowable at the rolling temperature.

12. A method of continuously casting thin steel strip of no more than 3 mm in thickness produced by direct casting by a twin roll caster comprising:
    (a) casting thin steel strip to no more than 3 mm in thickness in a twin roll caster,
    (b) feeding the cast strip through a roll bite between a pair of work rolls,
    (c) applying strip squeezing forces between the work rolls to reduce the thickness of the cast strip, and
    (d) applying tension to the cast strip passing to the work rolls sufficiently high to avoid buckling stress in the strip entering the work rolls, and sufficiently low as to produce no more than 1% strip elongation through creep.

13. A method as claimed in claim 12, wherein the strip thickness is in the range of 0.5 mm to 2 mm prior to feeding to the work rolls.

14. A method as claimed in claim 13, wherein the strip is hot rolled at a temperature in the range of 700° C. to 1200° C.

15. A method as claimed in claim 14, wherein the strip is hot rolled at a temperature in the range 900° C. to 1200° C.

16. A method as claimed in claim 12, wherein the strip is hot rolled at a temperature in the range of 700° C. to 1200° C.

17. A method as claimed in claim 16, wherein the strip is hot rolled at a temperature in the range 900° C. to 1200° C.

18. A method according to claim 12, wherein the applied tension is such as to limit the strip elongation through creep to no more than 0.5%.

19. A method according to claim 12, wherein the variation in strip thickness reduction across the strip as imposed by the work rolls is such that the strip shape defects downstream of the work rolls are no more than 400 I-units.

20. A method according to claim 19, wherein said variation in strip thickness reduction is such that the strip shape defects downstream of the work rolls is no more than 200 I-units.

21. A method according to claim 12, wherein tension is applied to the strip by passing said strip through a pair of pinch rolls in advance of the work rolls.

22. A method according to claim 12, wherein the strip is a manganese/silicon killed steel strip of thickness in the range 0.5 mm to 3 mm,
    the strip is hot rolled in the temperature range 900° C. to 1200° C., and
    the applied tension is within an operating range between maximum and minimum values defined by:
    tension max=maximum allowable elongation at the rolling temperature, and
    tension min=maximum strip buckle stress allowable at the rolling temperature.

* * * * *